United States Patent
Masini et al.

(10) Patent No.: US 9,781,768 B2
(45) Date of Patent: Oct. 3, 2017

(54) METHODS AND ARRANGEMENTS FOR MANAGING A COMMUNICATION INTERFACE BETWEEN THE BASE STATIONS

(71) Applicant: Telefonaktiebolaget L M Ericsson (publ), Stockholm (SE)

(72) Inventors: Gino Luca Masini, Stockholm (SE); Angelo Centonza, Winchester (GB); Martin Israelsson, Spånga (SE); Alexander Vesely, Feldbach (AT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 17 days.

(21) Appl. No.: 14/785,673

(22) PCT Filed: Sep. 22, 2015

(86) PCT No.: PCT/SE2015/050984
§ 371 (c)(1),
(2) Date: Oct. 20, 2015

(87) PCT Pub. No.: WO2016/053161
PCT Pub. Date: Apr. 7, 2016

(65) Prior Publication Data
US 2016/0255677 A1 Sep. 1, 2016

Related U.S. Application Data

(60) Provisional application No. 62/059,305, filed on Oct. 3, 2014.

(51) Int. Cl.
*H04W 76/06* (2009.01)
*H04W 36/30* (2009.01)
(Continued)

(52) U.S. Cl.
CPC .......... *H04W 76/06* (2013.01); *H04W 24/00* (2013.01); *H04W 36/30* (2013.01); *H04W 92/00* (2013.01); *H04W 92/20* (2013.01)

(58) Field of Classification Search
None
See application file for complete search history.

(56) References Cited

U.S. PATENT DOCUMENTS

2009/0247159 A1* 10/2009 Flore ..................... H04W 24/02
455/434
2011/0268007 A1* 11/2011 Barany .................. H04B 7/024
370/312
(Continued)

FOREIGN PATENT DOCUMENTS

EP    2693832 A1    2/2014

OTHER PUBLICATIONS

Alcatel-Lucent, "R3-140401: Introduce X2 Release procedure in Stage-3," 3rd Generation Partnership Project (3GPP), TSG-RAN WG3 Meeting #83, Technical Specification 36.423, Change Request 0637, Version 12.0.0, Feb. 10-14, 2014, 34 pages, Prague, Czech Republic.
(Continued)

*Primary Examiner* — Kodzovi Acolatse
(74) *Attorney, Agent, or Firm* — Withrow & Terranova, PLLC

(57) ABSTRACT

A first base station and a second base station, comprised in a wireless communication network, for managing a communication interface that is already set-up for communication between said base stations. The first base station determines to release said communication interface and sends, in response to the determination, a release message to the second base station. The release message commands the second base station to release the communication interface and comprises an indicator that indicates that it shall be
(Continued)

avoided to attempt to again set up the communication interface and/or to set-up any further communication interface between the first base station and the second base station.

24 Claims, 6 Drawing Sheets

(51) Int. Cl.
*H04W 24/00* (2009.01)
*H04W 92/00* (2009.01)
*H04W 92/20* (2009.01)

(56) References Cited

U.S. PATENT DOCUMENTS

| | | | | |
|---|---|---|---|---|
| 2011/0306363 | A1* | 12/2011 | Wang | H04W 24/02 455/456.1 |
| 2012/0100860 | A1* | 4/2012 | Lei | H04W 36/20 455/438 |
| 2012/0220291 | A1* | 8/2012 | Olsson | H04W 76/028 455/423 |
| 2015/0092552 | A1* | 4/2015 | Bajj | H04W 28/08 370/235 |
| 2015/0126191 | A1* | 5/2015 | Yajima | H04W 36/08 455/436 |

OTHER PUBLICATIONS

Ericsson, "R3-142938: X2 Removal Signaling (with Additional Functionality)," 3rd Generation Partnership Project (3GPP), TSG-RAN WG3 Meeting #86, Technical Specification 36.423, Change Request 0778, Version 12.3.0, Nov. 17-21, 2014, 17 pages, San Francisco, USA.

Ericsson, "S5-091378: pCR 32.762-110 Remove asymmetry in X2 handling," 3rd Generation Partnership Project (3GPP), TSG-SA5 (Telecom Management) Meeting SA5#63, Feb. 16-20, 2009, 8 pages, Prague, Czech Republic.

Nokia Networks, "R2-151471: Analysis of scenarios for X2 Removal," 3rd Generation Partnership Project (3GPP), TSG-RAN WG3 Meeting #89, Aug. 24-28, 2015, 6 pages, Beijing, P. R. China.

International Search Report and Written Opinion for International Patent Application No. PCT/SE2015/050984, mailed Dec. 16, 2015, 13 pages.

Author Unknown, "Technical Specification Group Radio Access Network: Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.3.0, 3GPP Organizational PArtners, Sep. 2014, 215 pages.

Author Unknown, "Technical Specification Group Radio Access Network; Evolved Universal Terrestrial Radio Access Network (E-UTRAN); X2 general aspects and principles (Release 12)," Technical Specification 36.420, Version 12.0.0, 3GPP Organizational Partners, Jun. 2014, 12 pages.

Author Unknown, "Technical Specification Group Radio Access Network; Evolved Universal Terrestrial Radio Access Network (E-UTRAN); X2 application protocol (X2AP)(Release 12)," Technical Specification 36.423, Version 12.3.0, 3GPP Organization Partners, Sep. 2014, 153 pages.

DTAG, "R3-142412: Correction X2 interface maintenancde procedures," 3rd Generation Partnership Project (3GPP), TSG RAN WG3 Meeting #85bis, Oct. 6-10, 2014, 9 pages, Shanghai, P.R.

\* cited by examiner

X2 RELEASE
This message may be used to indicate that the signaling connection to an eNB is unavailable.
Direction: eNB₁ → eNB₂.

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| X2 Setup Indication | O | | ENUMERATED (DoNotRetry, TemporaryStop, ...) | Provides information to eNB₂ concerning future X2 Setup attempts | YES | ignore |
| X2 Context Retention | O | | ENUMERATED (Retain, Remove,...) | Indicates whether information relative to procedures in execution over the X2 interface should be removed or retained | YES | ignore |

Fig. 3

METHODS AND ARRANGEMENTS FOR MANAGING A COMMUNICATION INTERFACE BETWEEN THE BASE STATIONS

This application is a 35 U.S.C. §371 national phase filing of International Application No. PCT/SE2015/050984, filed Sep. 22, 2015, which claims the benefit of U.S. Provisional Application No. 62/059,305, filed Oct. 3, 2014, the disclosures of which are incorporated herein by reference in their entireties.

TECHNICAL FIELD

Embodiments herein relate to first and second base stations, e.g. eNBs, of a wireless communication network, such as a telecommunications network, that may be based on Long Term Evolution (LTE). In particular embodiments herein relate to managing of a communication interface that is set-up between said base stations.

BACKGROUND

Communication devices such as wireless devices are also known as e.g. User Equipments (UEs), mobile terminals, wireless terminals and mobile stations (MSs). Wireless devices are enabled to communicate wirelessly in a cellular communication network, wireless communication network or wireless communication system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station (BS), e.g., a Radio Base Station (RBS), which sometimes may be referred to as e.g. NodeB (NB), evolved Node B (eNB or eNodeB), NodeB, B node, node B or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which may be referred to as 3G, and which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a wireless device. The expression Uplink (UL) may be used for the transmission path, or send direction, in the opposite direction, i.e. from a wireless device to a base station.

An LTE RAN is currently capable of setting up and maintaining a peer-to-peer interface, named X2, between pairs of eNBs, see e.g. TS 36.300, version 12.3.0, overall architecture chapter 4. X2 is based on SCTP, see e.g. TS 36.420, version 12.0.0, chapter 6.4, "X2 interface protocol structure" and its procedures are defined by a specific protocol, X2 Application Protocol (X2AP), see e.g. TS 36.423, version 12.3.0 and chapter 8.3.3 "X2 Setup procedure". It is currently possible for an eNB to autonomously set up X2 to another eNB when there is a need to execute procedures, for example mobility, configuration and coordination of parameters.

Until recently, the need to efficiently remove an X2 interface between two eNBs was not considered as worthy of any attention, especially in the standards. As for example stated in a document submitted to RAN3#85bis by Deutsche Telecom AG, 3GPP R3-142412, "Correction X2 interface maintenance procedures": "While in the early times of LTE development, the automatic set up of interfaces had priority, now operator are right in the phase to maintain already deployed and set up networks in an efficient way. Operators are facing operational problems in context of maintaining X2 relations, in their continuously growing networks."

Hence, operators may need to be able quickly and permanently remove an existing X2 interface, e.g. to reconfigure the underlying transport network, or to perform maintenance, etc., and to make sure the other peer eNB does not attempt to retry setup. In fact, many implementations may perceive the "manual" removal of an underlying Stream Control Transmission Protocol (SCTP) connection as a temporary connection failure and therefore attempt to set up X2 again to the same peer, causing additional manual intervention, unwanted signaling and potential outage.

Present solutions for removal, or release, of an X2 interface comprise:

- Act via Operation And Maintenance (OAM) on both eNBs simultaneously and remove the X2 relation. This requires manual intervention on each eNB and may require a certain degree of synchronization as well as some flexibility from the eNB implementation, For example, if the other end perceives that the X2 relation is unavailable, e.g. due to the absence of SCTP connection, before it has received the new OAM setting, it may interpret this as a temporary connection failure and it may unnecessarily trigger a new X2 setup. See e.g. the above mentioned document 3GPP R3-142412, "Correction X2 interface maintenance procedures".
- Set the "No X2" flag in the Neighbor Relationship Table (NRT), see e.g. 3GPP TS 36.300, version 12.3.0, section 22.3.2. This also requires OAM intervention on both eNBs. For example, if done on only one eNB, the other will keep retrying and be rejected until some additional action by the operator.
- Use a new dedicated Class 1 procedure, e.g. the one named X2 Removal as proposed in the above mentioned document R3-142412, "Correction X2 interface maintenance procedures". However a whole new procedure requires relative complex implementation.

Furthermore, for all the solutions above there is no way to prevent the target eNB from retrying to set up X2, i.e. there is no way to signal that a desired removal of X2 shall be permanent.

SUMMARY

It is an object to alleviate or a least reduce some or all of the above indicated problems. A more specific object is to provide improvements regarding an X2 interface set-up for communication between eNBs.

According to a first aspect of embodiments herein, the object is achieved by a method, performed by a first base station, for managing a communication interface that is already set-up for communication with another, second base station. The first base station and the second base station are comprised in a wireless communication network. The first base station determines to release said communication interface. The first base station then sends, in response to said determination, a release message to the second base station. The release message commands the second base station to release the communication interface and comprises an indicator that indicates that it shall be avoided to attempt to again set up the communication interface and/or to set-up any further communication interface between the first base station and the second base station.

According to a second aspect of embodiments herein, the object is achieved by a computer program comprising instructions that when executed by a processing circuit cause the first base station according to the first aspect to perform the method.

According to a third aspect of embodiments herein, the object is achieved by a data carrier comprising the computer program according to the second aspect.

According to a fourth aspect of embodiments herein, the object is achieved by a method, performed by a second base station, for managing a communication interface that is already set-up for communication with another, first base station. The first base station and the second base station are comprised in a wireless communication network. The second base station receives, from the first base station, a release message commanding the second base station to release the communication interface. The release message also comprises an indicator that indicates that it shall be avoided to attempt to again set up the communication interface and/or to set-up any further communication interface between the first base station and the second base station.

According to a fifth aspect of embodiments herein, the object is achieved by a computer program comprising instructions that when executed by a processing circuit cause the second base station according to the fourth aspect to perform the method.

According to a sixth aspect of embodiments herein, the object is achieved by a data carrier comprising the computer program according to the fifth aspect.

According to a seventh aspect of embodiments herein, the object is achieved by a first base station for managing a communication interface that is already set-up for communication with another, second base station. The first base station and the second base station are being configured to be comprised in a wireless communication network. The first base station is further configured to determine to release said communication interface and to send, in response to said determination, a release message to the second base station. Said release message commands the second base station to release the communication interface. The release message also comprises an indicator that indicates that it shall be avoided to attempt to again set up the communication interface and/or to set-up any further communication interface between the first base station and the second base station.

According to an eight aspect of embodiments herein, the object is achieved by a second base station for managing a communication interface that is already set-up for communication with another, first base station. The first base station and the second base station are configured to be comprised in a wireless communication network. The second base station is further configured to receive, from the first base station, a release message commanding the second base station to release the communication interface. The release message also comprises an indicator that indicates that it shall be avoided to attempt to again set up the communication interface and/or to set-up any further communication interface between the first base station and the second base station.

Thanks to embodiments herein and the first indicator, that e.g. may be a first information element, such as an "X2 Setup Indication IE" when the wireless communication network is LTE-based, the second base station may, after release of the communication interface, be made to efficiently avoid again setting up this or any further communication interface, e.g. X2, when this is not desirable. Moreover, embodiments herein also enable the second base station to distinguish between the case when connection is accidentally lost, e.g. due to a transport network failure, and the case when the X2 interface is intentionally released. At the same time embodiments herein enable implementation in an LTE or LTE-based network as an extension, e.g. by introducing said first information element to an existing X2 release message, which may enable simple and more efficient implementation compared to if a complete new procedure is introduced. Further, embodiments herein enable implementation that can be used between communication interfaces directly between the base stations, without a gateway, such as an X2 GW.

BRIEF DESCRIPTION OF THE DRAWINGS

The various aspects of embodiments disclosed herein, including particular features and advantages thereof, will be readily understood from the following detailed description and the accompanying schematic drawings, which are briefly described in the following.

FIG. 3, already mentioned above, illustrates and exemplifies a possible modified X2 Release message that may be used in implementation of embodiments herein.

DETAILED DESCRIPTION

Figure 1:
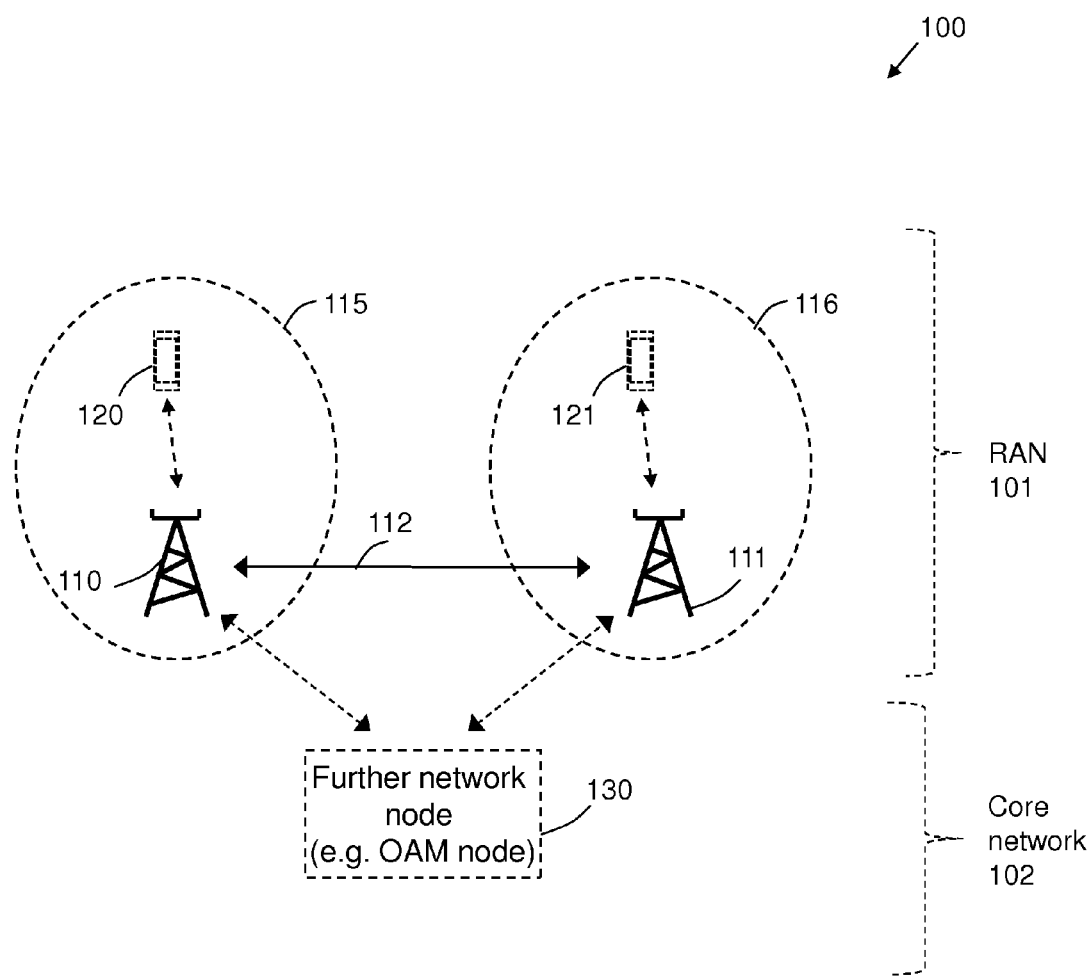
FIG. 1 is a schematic block diagram schematically depicting an example of a wireless communication network relevant for embodiments herein.

Throughout the following description similar reference numerals may be used to denote similar elements, units, modules, circuits, nodes, parts, items or features, when applicable. Features that may be optional in embodiments herein are typically marked with dashed lines in the drawings.

As part of the development towards embodiments herein, the situation and problems indicated above will first be further discussed.

An X2 Release procedure has been defined in Rel-12 of TS 36.300, see e.g. version 12.3.0, chapter 20.2.2.16 and TS 36.423, see e.g. version 12.3.0, chapter 8.4. The X2 Release procedure is for indicating that a signaling connection is unavailable, e.g. because a Home eNb (HeNB) is about to switch off or a connection was accidentally lost. This procedure, however, is currently only defined for the X2 GateWay (X2 GW), to signal that X2 to the other end is not available any more. So, as currently defined, this procedure cannot be applied when an X2 GW is not deployed, e.g. in case of communication directly between eNBs.

The X2 GW was introduced in 3GPP Release 12 to allow the aggregation of X2 connections between a multitude of HeNBs and eNBs. Note that embodiments herein may be applicable to any kind of deployment of eNBs, also such deploying X2 interface aggregation with X2 GWs.

Embodiments herein, which will be described in further detail below, enable to signal to a receiving eNB that the X2 interface from the sender to the receiving eNB is to be released or removed permanently, or at least until further network reconfiguration is made by an operator. This may be accomplished through only a single operator trigger on either peer node, without the need for further action or reconfiguration.

Moreover, embodiments herein may be implemented as an extension, by introduction of one or more new information elements to said existing X2 Release procedure, to e.g. signal information about future X2 setup attempts after X2 removal and about the retention policy for X2 interface related data. Furthermore. embodiments herein are applicable between eNBs, also without an X2 GW deployed and enable a solution that is simpler compared to if a complete new procedure is introduced.

FIG. 1 is a schematic block diagram depicting an example of a wireless communication network 100 relevant for embodiments herein. The wireless communication network 100 is typically a telecommunication system, such as a cellular communication network and may be an LTE, or LTE-based, wireless communication network.

The wireless communication network may comprise a part that is a core network 101 and a part that is a radio access network, or RAN, 102.

Moreover, the wireless communication network 100 comprises a first base station 110, e.g. a first eNB, that may serve one or more wireless devices, e.g. a first wireless device 120, in a first cell 115. The wireless communication network 100 also comprises a second base station 111, e.g. a second eNB, that may serve one or more wireless devices, e.g. a second wireless device 122, in a second cell 116.

The first and second base stations 110, 111 may communicate with each other over a communication interface 112. The communication interface may be a peer-to-peer communication interface, e.g. X2. The communication interface may be one that is set-up and in use, and/or be available, for communication between the first and second base stations. In other words, the communication interface 112 may be one that is set-up and up and running between the first and second base stations 110, 111.

The wireless communication network 100 may further comprise one or more further network nodes, e.g. a further network node 130 that may be a management node that may be associated with and/or at least partly may be controlled by an operator of the wireless communication network 100. The further network node 130 may be comprised in and/or be associated with an OAM part or functionality of the wireless communication network. The further network node may be an OAM node.

Attention is drawn to that FIG. 1 is only schematic and for exemplifying purpose and that not everything shown in the figure is required for all embodiments herein, as will be evident to the skilled person based on what is disclosed herein. Also, a wireless communication network that in reality corresponds to the wireless communication network 100 typically comprises several further network nodes, base stations, cells etc., as realized by the skilled person, but which are not shown herein for the sake of simplifying.

Figure 2:
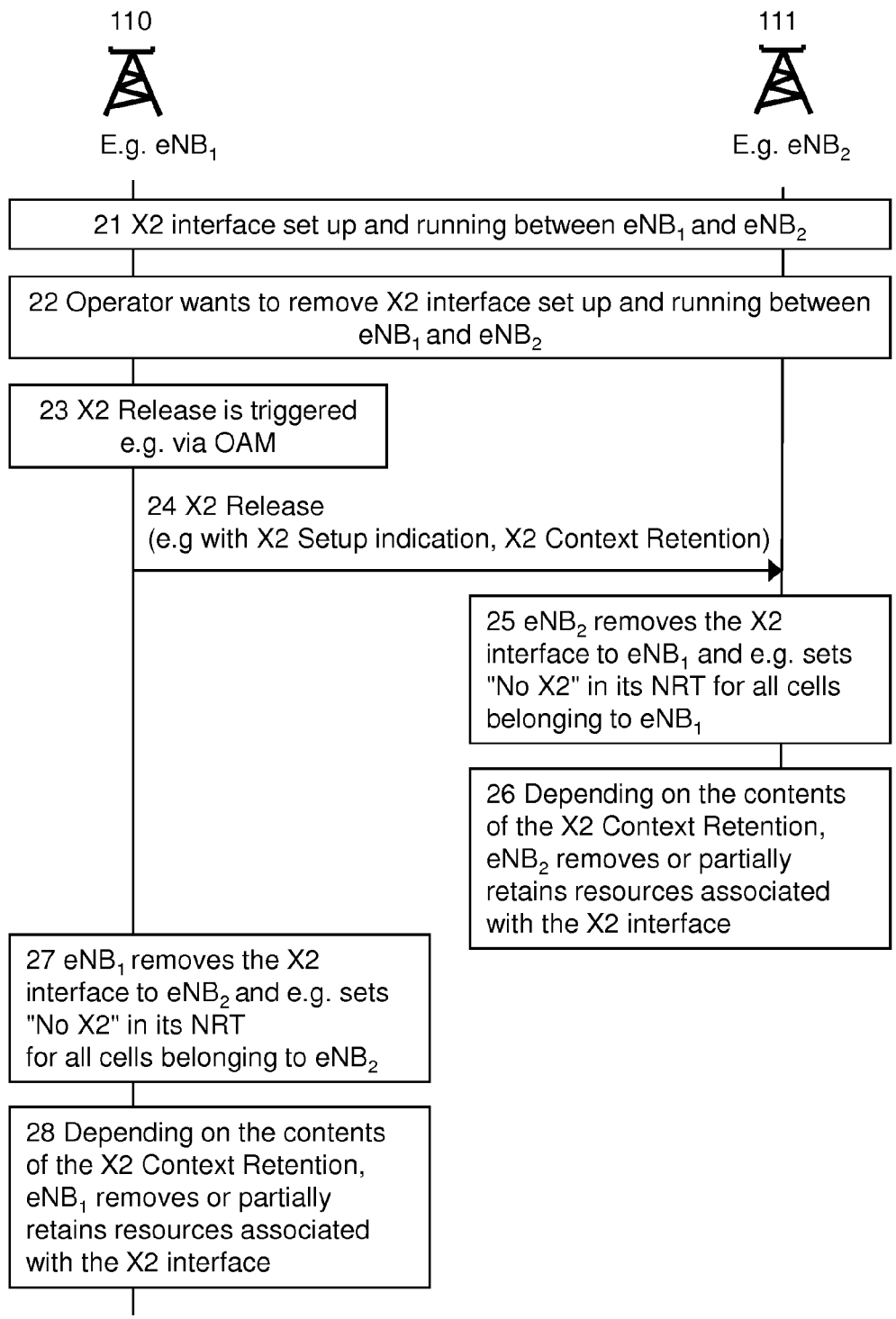
FIG. 2 is a combined signalling diagram and flowchart for describing embodiments herein by means of a detailed example.

FIG. 2 is a combined signalling diagram and flowchart for describing embodiments herein by means of a detailed example. The nodes involved is a first eNB, $eNB_1$, which is an example of the first base station 110, and a second eNB, $eNB_2$, which is an example of the second base station 111.

Action 21

A X2 interface is set-up and running between $eNB_1$ and $eNB_2$.

Action 22

An operator may determine or decide to either:

Remove permanently the X2 interface between the two eNBs, e.g. when it in a foreseeable future there appears to be no use in keeping an X2 signalling relation between the concerned eNBs; or Remove the X2 interface temporarily, e.g. when re-establishment of the X2 signalling relation is expected in the foreseeable future.

Action 23

The removal may be triggered via OAM, for example via the further network node 130.

Action 24

The eNB$_1$ sends a X2 Release message to eNB$_2$. The X2 Release message may be an extended version or variant of an existing X2 Release message, e.g. as illustrated in FIG. 3, illustrating a possible modified X2 Release message that may be used in implementation of embodiments herein. A dotted line indicates new parts. In the shown example, the signalled Global eNB IDentity (ID) should refer to eNB$_1$.

Actions 25-26

Upon reception of the message, eNB$_2$ may remove all resources associated with the X2 interface to eNB$_1$ e.g. depending on the contents of the X2 Context Retention Information Element (IE) if such is present and may set "No X2" in its NRT for all cells belonging to eNB$_1$.

Actions 27-28

Once the eNB$_1$ has successfully sent the extended X2 Release message to the eNB2, it may perform the same or corresponding actions as eNB$_2$ in the previous actions.

Note that a condition for actions 25-28 to be performed may be a successful reception and delivery in action 24 of the extended X2 Release message. Removal of associated resources represent a local action, hence execution of actions 25-28 need not be consequential and their execution order may be reversed, since they may be executed independently by both eNBs.

The added X2 Setup Indication IE, as shown in FIG. 3, may indicate whether the node, in the example eNB$_2$, receiving the X2 Release message shall avoid retrying to setup an X2 connection in the future, e.g. when value is set to "DoNotRetry". Alternatively it may indicate whether the node should refrain from attempting to setup a new X2 connection for a pre-configured time duration, after which the node then is allowed and may attempt to trigger X2 setup, e.g. when value is set to "TemporaryStop".

Upon triggering, or acting upon the sent, extended X2 RELEASE message e.g. as shown in FIG. 3, all possibly ongoing signalling between the eNBs may be aborted and respective data may be deleted. Alternatively, some or all of such data may be kept. However, if an intention is to remove the X2 signalling relation between the two eNBs rather permanently, a potential usefulness of keeping signalling procedure control data that concerns the removed X2 signalling relation, such as measurement IDs, X2 application protocol IDs, etc., will probably, at least under certain circumstances, be disappearing after some time. However, if considered useful, all or some data may be kept in case an X2 Setup procedure may be triggered between the same nodes later. The nodes may then (re)-use data and/or resume previously established procedures.

In order to enable that procedures may be resumed once a new X2 Setup is triggered between the two nodes after X2 removal or release, yet another IE may be added, for example named "X2 Context Retention" as also illustrated in FIG. 3, which may specify whether the context of information relative to procedures running on an X2 interface subject to X2 removal or release shall be kept or shall be removed. For example, an identification to retrieve the above mentioned signalling procedure control data relative to procedures running on an X2 interface subject to X2 removal may be kept because it is known that the X2 connection may be re-established soon after the removal.

FIG. 3, already mentioned above, illustrates and exemplifies a possible modified X2 Release message that may be used in implementation of embodiments herein. In particular, the shown message comprises a modification in the form of an exemplary IE named "X2 Setup Indication" that may be used to indicate whether a receiver of the X2 Release message shall avoid retrying to setup an X2 connection in the future, e.g. when a value is set to "DoNotRetry", or whether it should refrain from attempting to setup a new X2 connection for a pre-configured time duration, after which the node then is allowed and may attempt to trigger X2 setup, e.g. when a value is set to "TemporaryStop". Further, the shown message also comprises a modification in the form of an exemplary IE named "X2 Context Retention" that may be used to specify whether a context of information relative to procedures running on an X2 interface subject to X2 removal or release shall be kept or shall be removed.

As should be realized from the above, it has been enabled to signal to the eNB$_2$, i.e. a receiving eNB, that the X2 interface from the eNB$_1$, i.e. a sending eNB, to the receiving eNB, is to be released or removed permanently, or at least until further network reconfiguration is made by an operator. This may be accomplished through only a single operator trigger on either peer node, without the need for further action or reconfiguration.

Moreover, embodiments described herein may thus be implemented as an extension, by introduction of one or more new information elements to said existing X2 Release procedure, to e.g. signal information about future X2 setup attempts after X2 removal and about the retention policy for X2 interface related data. Furthermore, embodiments herein are applicable between eNBs, also without an X2 GW deployed and enable a solution that is simpler compared to if a complete new procedure is introduced.

In other words, embodiments herein enable a conventional X2 Release procedure as described above to be used also between two eNBs, such as the eNB$_1$ and the eNB$_2$, instead of only between an X2 GW and an eNB, as is the case for said conventional X2 Release message.

Moreover, embodiments herein also enable a target of the X2 Release message, e.g. eNB$_2$, to distinguish between the case when connection is accidentally lost, e.g. due to a transport network failure, and the case when the X2 interface is released or removed, e.g. because of new operator settings.

Further, in case of connections removed due to short term conditions, embodiments herein enable to indicate retention of the connection context in order to resume procedures as soon as a new connection setup is triggered and executed successfully.

Figure 4:
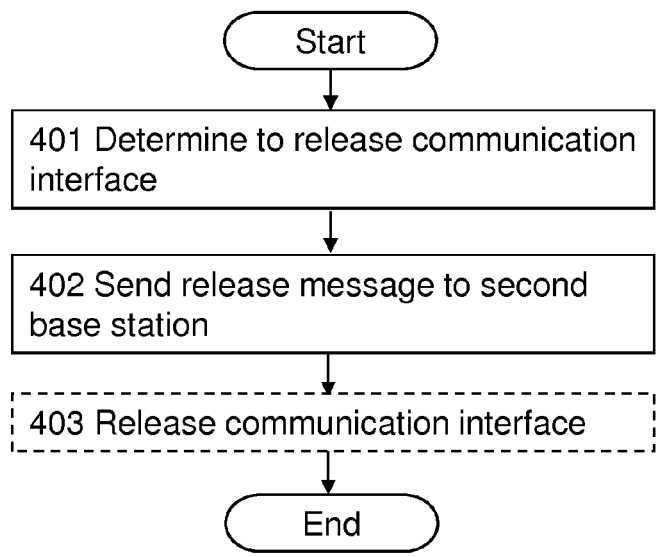
FIG. 4 is a flowchart schematically illustrating embodiments of a method performed by a first base station.

FIG. 4 is a flowchart schematically illustrating embodiments of a method performed in a first base station, e.g. the first base station 110. The method is for managing or handling, a communication interface, e.g. the communication interface 112, that is already set-up for communication with another, second base station, e.g. the second base station 111. The first and second base stations are comprised in a wireless communication network, e.g. the wireless communication network 100. The method comprises the following actions that may be executed in any suitable order:

Action 401

The first base station 110 determines to release said communication interface 112. It may be determined to release the communication interface 112 permanently or temporary. The determination may be in response to a triggering message received from another node, e.g. the further network node 130, of the wireless communication network. The triggering message may comprise information whether the communication interface 112 should be permanently or temporary released.

This action may fully or partly correspond to the actions 22-23 discussed above in connection with FIG. 2.

Action 402

The first base station 110 sends, in response to said determination, a release message to the second base station 111. The release message may be named "X2 Release message" and may correspond to the message discussed above in relation to FIG. 3. The release message commands the second base station 111 to release the communication interface 112. The release message comprises a first indicator, such as a first information element, that indicates that it shall be avoided to attempt to again set up the communication interface 112 and/or to set-up any further communication interface between the first base station 110 and the second base station 111. In other words, the first indicator may indicate that it shall be avoided to set-up any further communication interface between the first base station 110 and the second base station 111 and/or that it shall be avoided any attempt, e.g. retry, to again set-up the communication interface 112, after the communication interface 112 has been released. When the first indicator is said first information element it may be named "X2 Setup Indication" and may correspond to the information element with this name discussed above in relation to FIG. 3.

The further communication interface is typically a communication interface of the same type, e.g. X2, as said communication interface 112 being subject for the release.

The first indicator may further indicate that said avoidance is valid only temporary, e.g. for a certain time period. The certain time period may be predetermined and/or predefined. The certain time period may already be known to one or more of the involved base stations and/or be indicated in the release message. The first indicator may indicate that the avoidance is temporary in response to that it was determined to temporary release the already set-up communication interface 112.

In some embodiments, the release message comprises a second indicator, such as a second information element that indicates whether certain resources associated with the communication interface 112 shall be retained or shall, or need, not be retained. When the second indicator is said second information element it may be named "X2 Context Retention" and may correspond to the information element with this name discussed above in relation to FIG. 3. The second indicator may indicate that said certain resources shall be retained in response to that it was determined to temporary release the communication interface 112. Said certain resources may be retained temporary. In case said avoidance is valid only temporary, e.g. during said certain time period, said certain resources should be retained at least longer than this.

The second indictor may further indicate that said certain resources shall, or need, not be retained in response to that it was determined to permanently release the communication interface.

This action may fully or partly correspond to action 24 discussed above in connection with FIG. 2.

Action 403

The first base station 110 may, in response to that the release message has been sent to the second base station 111, release the communication interface 112. The release should be performed fully or partly in accordance with what the release message commands and indicates, i.e. the first and second base stations may thereby handle release of the communication interface in the same or corresponding manner.

This action may fully or partly correspond to actions 27-28 discussed above in connection with FIG. 2.

There may also be an additional action (not shown) of communicating with the second base station 111 over and/or using the communications interface 112, which action precedes Action 401. This action may fully or partly correspond to action 21 discussed above in connection with FIG. 2.

Figure 5:
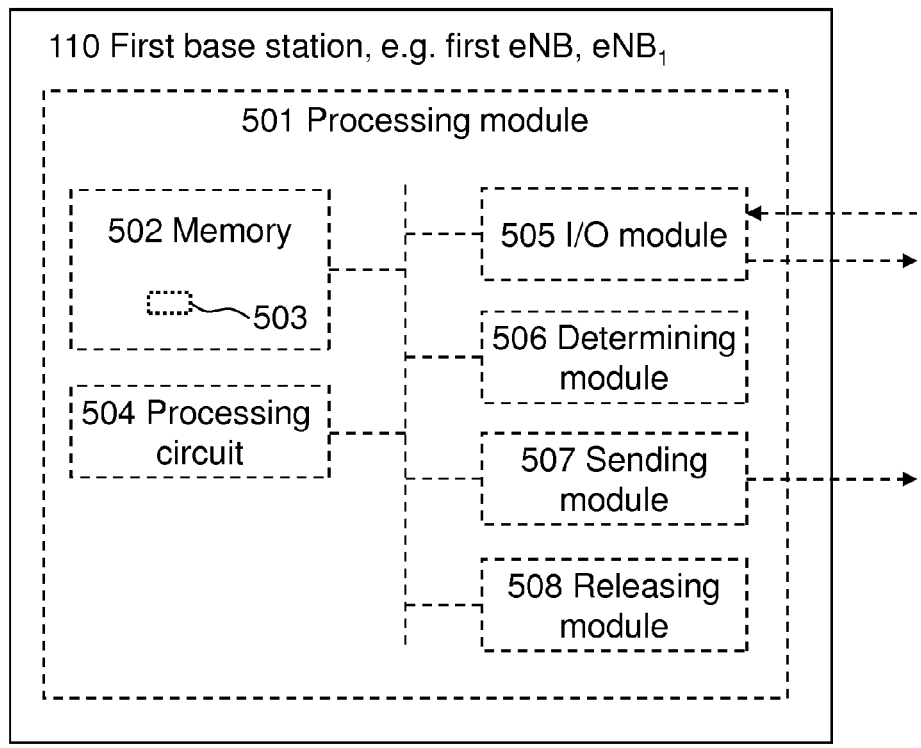
FIG. 5 is a schematic block diagram for illustrating embodiments of the first base station.

FIG. 5 is a schematic block diagram for illustrating embodiments of the first base station 110, in particular how it may be configured to perform the method and/or one or more of the actions discussed above in relation to FIG. 4. Hence, the first base station 110 may comprise:

A processing module 501, such as a means, one or more hardware modules, including e.g. one or more processors, and/or one or more software modules for performing said method and/or actions.

A memory 502 that may comprise, such as contain or store, a computer program 503. The computer program comprises 'instructions' or 'code' directly or indirectly executable by the first base station 110 so that it performs said method and/or actions. The memory 502 may comprise one or more memory units and may be further be arranged to store data, such as configurations and/or applications involved in or for performing functions and actions of embodiments herein.

A processing circuit 504 as an exemplifying hardware module and may comprise or correspond to one or more processors. In some embodiments, the processing module 501 may comprise, e.g. 'is embodied in the form of' or 'realized by' the processing circuit 504. In these embodiments, the memory 502 may comprise the computer program 503 executable by the processing circuit 504, whereby the first base station 110 is operative, or configured, to perform said method and/or actions.

An Input/Output (I/O) module 505, configured to be involved in, e.g. by performing, any communication to and/or from other units and/or nodes, such as sending and/or receiving information to and/or from other external nodes or devices. The I/O module 505 may be exemplified by an obtaining, e.g. receiving, module and/or a sending module, when applicable.

The first base station 110 may also comprise other exemplifying hardware and/or software module(s), which module(s) may be fully or partly implemented by the processing circuit 504. For example, the first base station 110 may further comprise one or more of the following; a determining module 506, a sending module 507, and/or a releasing module 508.

Hence, the first base station 110 and/or the processing module 501 and/or the processing circuit 504 and/or the determining module 506 may be operative, or configured, to determine to release said communication interface 112.

Moreover, the first base station 110 and/or the processing module 501 and/or the processing circuit 504 and/or the I/O module 505 and/or the sending module 507, may be operative, or configured, to, in response to said determination, send said release message to the second base station 111.

Additionally, the first base station 110 and/or the processing module 501 and/or the processing circuit 504 and/or the releasing module 508, may be operative, or configured, to, in response to that said release message has been sent to the second base station 111, release said communication interface 112, wherein the release is performed in accordance with what the release message commands and indicates.

Figure 6:
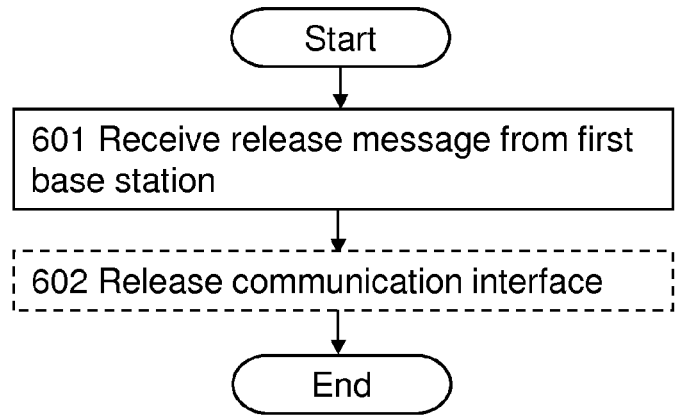
FIG. 6 is a flowchart schematically illustrating embodiments of a method performed by a second base station.

FIG. 6 is a flowchart schematically illustrating embodiments of a method performed in a second base station, e.g. the second base station 111. The method is for managing or handling, a communication interface, e.g. the communication interface 112, that is already set-up for communication with another, first base station, e.g. the first base station 111. The first and second base stations are comprised in a wireless communication network, e.g. the wireless communication network 100. The method comprises the following actions that may be executed in any suitable order:

Action 601

The second base station 111 receives, from the first base station 110, a release message, such as the release message described above under Action 402.

This action may fully or partly correspond to action 24 discussed above in connection with FIG. 2.

Action 602

The second base station 111 may release, in response to the received release message, the communication interface 112. The release should be performed fully or partly in accordance with what the release message commands and indicates.

This action may fully or partly correspond to actions 25-26 discussed above in connection with FIG. 2.

There may also be an additional action (not shown) of communicating with the first base station 110 over and/or using the communications interface 112, which action precedes Action 601. This action may fully or partly correspond to action 21 discussed above in connection with FIG. 2.

Figure 7:
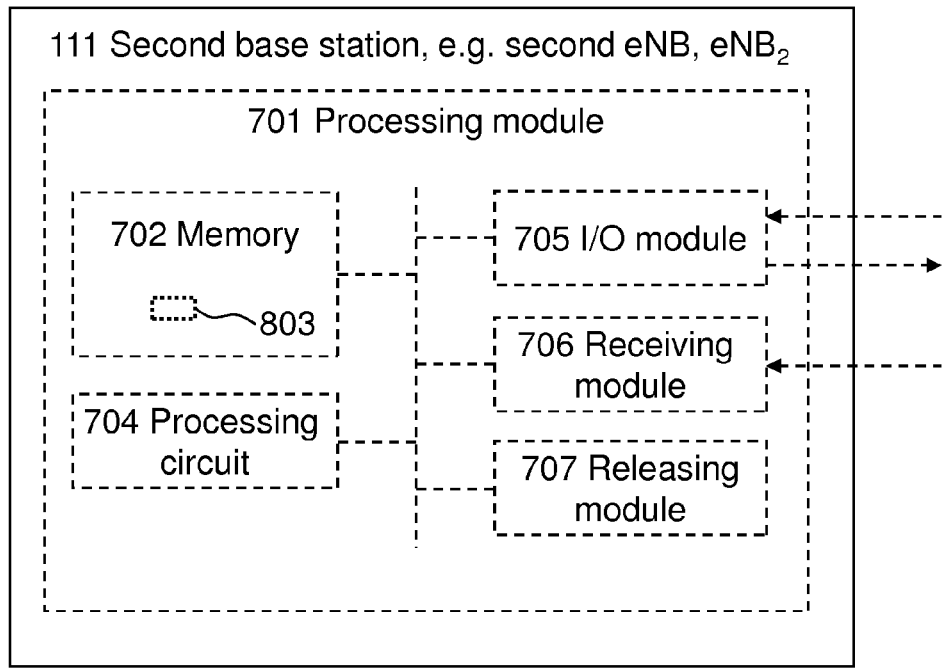
FIG. 7 is a schematic block diagram for illustrating embodiments of the second base station.

FIG. 7 is a schematic block diagram for illustrating embodiments of the second base station 111, in particular how it may be configured to perform the method and one or more of actions discussed above in relation to FIG. 6. Hence, the second base station 111 may comprise:

A processing module 701, such as a means, one or more hardware modules, including e.g. one or more processors, and/or one or more software modules for performing said method and/or actions.

A memory 702 that may comprise, such as contain or store, a computer program 703. The computer program comprises 'instructions' or 'code' directly or indirectly executable by the second base station 111 so that it performs the said method and/or actions. The memory 702 may comprise one or more memory units and may be further be arranged to store data, such as configurations and/or applications involved in or for performing functions and actions of embodiments herein.

A processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the second base station 111 is operative, or configured, to perform said method and/or actions.

An Input/Output (I/O) module 705, configured to be involved in, e.g. by performing, any communication to and/or from other units and/or nodes, such as sending and/or receiving information to and/or from other external nodes or devices. The I/O module 705 may be exemplified by an obtaining, e.g. receiving, module and/or a sending module, when applicable.

The second base station 111 may also comprise other exemplifying hardware and/or software module(s), which module(s) may be fully or partly implemented by the processing circuit 704. For example, the second base station 111 may further comprise one or more of the following: a receiving module 706 and a releasing module 707.

Hence, the second base station 111 and/or the processing module 701 and/or the processing circuit 704 and/or the receiving module 806 and/or the I/O module 705 may be operative, or configured, to receive said release message from the first base station 110.

Moreover, the second base station 111 and/or the processing module 701 and/or the processing circuit 704 and/or the releasing module 707 may be operative, or configured, to, in response to the received release message, release said communication interface 112, wherein the release is performed in accordance with what the release message commands and indicates.

Thanks to embodiments herein, such as described above, and the first indicator that may be said first information element, e.g. the "X2 Setup Indication IE", the second base station 111 may, after release of the communication interface 112, be made to efficiently avoid again setting up this or any further communication interface, e.g. X2, when this is not desirable. Moreover, embodiments herein also enable the second base station 111 to distinguish between the case when connection is accidentally lost, e.g. due to a transport network failure, and the case when an X2 interface is intentionally released. At the same time, embodiments herein enable implementation in an LTE or LTE-based network as an extension by introduction of said first information element to an existing X2 release message. This enable a simple and more efficient implementation compared to if a complete new procedure is introduced. Further, embodiments herein enable implementation that can be used between communication interfaces directly between the base stations, such as between the first base station 110 and the second base station 111, without a gateway, such as an X2 GW.

Figure 8A:
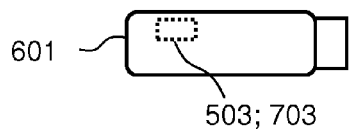
FIGS. 8a-c are schematic drawings illustrating embodiments relating to a computer program.
Figure 8B:
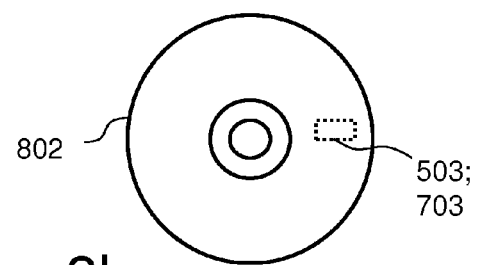
Figure 8C:
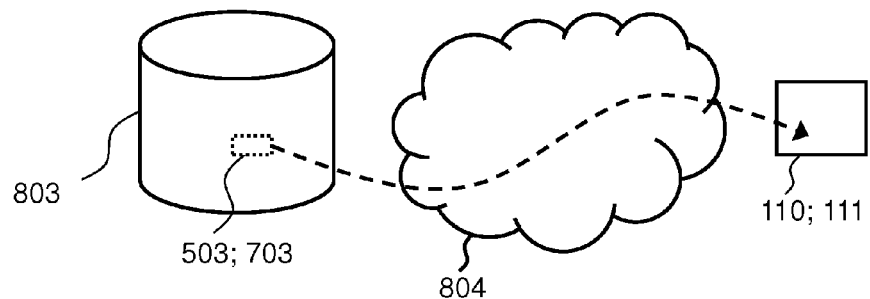

FIGS. 8*a-c* are schematic drawings illustrating embodiments relating to a computer program that may be the computer program 503 and/or 703 and that comprises instructions that when executed by the processing circuits 504, 704, respectively, and/or the processing modules 501, 701, respectively, causes the first base station 110 and/or the second base station 111 to perform as described above.

In some embodiments there is provided a computer program product, such as a data carrier, comprising a computer-readable medium and any one or both of the computer programs 503, 703 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 801 as in FIG. 8*a*, a disc storage medium 802 such as a CD or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 805, e.g. the Internet or a Local Area Network (LAN).

Any one or both of the computer program 503, 703 may furthermore be provided as a pure computer program or comprised in a file or files. The file or files may be stored on the computer-readable medium and e.g. available through download e.g. over the computer network 805, such as from the mass storage device 803 via a server. The server may e.g. be a web or File Transfer Protocol (FTP) server. The file or files may e.g. be executable files for direct or indirect download to and execution on the first base station 110 and/or the second base station 111, e.g. by an one or both of the processing circuits 504, 704, may be for intermediate download and compilation to make them executable before further download and execution causing the first base station 110 and/or the second base station 111 to perform the method(s) as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first base station 110 and/or the second base station 111 to be configured to and/or to perform the above-described methods, respectively.

As used herein, "releasing", and/or "removing", a communication interface may refer to making a communication interface that is already set-up for communication, and/or in use and/or available for use, no longer be set-up for communication and/or no longer be in use, and/or be available, for communication. For example, releasing the communication interface 112 may be associated with abortion of any ongoing signalling between the first base station 110 and the second base station 111 over the communication interface 112. Further, releasing the communication interface 112 may be associated with that one or more, or even all, resources and/or data, associated with the communication interface and/or signalling over it, are being released and/or deleted. The words "release" and "remove" regarding a communication interface may be used synonymously herein.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc. The term "radio network node" as used herein may as such refer to any type of network node serving a wireless device, e.g. UE, and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

Each of the terms "wireless device", "user equipment" and "UE", as used herein, may as such refer to any type of wireless device arranged to communicate with a radio network node in a wireless, cellular and/or mobile communication system, such as the wireless communication system 100, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device. Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first base station, second base station, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first base station, for managing a communication interface that is already set-up for communication with another, second base station, the first base station and the second base station being comprised in a wireless communication network, wherein the method comprises:

determining to release said communication interface, and sending, in response to said determination, a release message to the second base station, said release message commanding the second base station to release the communication interface and that comprises an indicator that indicates that it shall be avoided to attempt to again set up the communication interface and/or to set-up any further communication interface between the first base station and the second base station.

2. The method as claimed in claim 1, wherein the further communication interface is of a same type as said communication interface being subject for the release.

3. The method as claimed in claim 1, wherein the release message comprises a second indicator that indicates whether certain resources associated with the communication interface shall be retained, or shall, or need, not be retained.

4. The method as claimed in claim 3, wherein the second indicator indicates that said certain resources shall be retained in response to that it was determined to temporary release the communication interface.

5. The method as claimed in claim 1, wherein the first indicator further indicates that said avoidance is valid only temporary.

6. The method as claimed in claim 1, wherein the method further comprises:

releasing, in response to that said release message has been sent to the second base station, said communication interface, wherein the release is performed in accordance with what the release message commands and indicates.

7. A method, performed by a second base station, for managing a communication interface that is already set-up for communication with another, first base station, the first base station and the second base station being comprised in a wireless communication network, wherein the method comprises:

receiving, from the first base station, a release message commanding the second base station to release the communication interface and that comprises an indicator that indicates that it shall be avoided to attempt to again set up the communication interface and/or to set-up any further communication interface between the first base station and the second base station.

8. The method as claimed in claim 7, wherein the further communication interface is of a same type as said communication interface being subject for the release.

9. The method as claimed in claim 7, wherein the release message comprises a second indicator that indicates whether certain resources associated with the communication interface shall be retained, or shall, or need, not be retained.

10. The method as claimed in claim 9, wherein the second indicator indicates that said certain resources shall be retained in response to that it was determined to temporary release the communication interface.

11. The method as claimed in claim 7, wherein the first indicator further indicates that said avoidance is valid only temporary.

12. The method as claimed in claim 7, wherein the method further comprises:

releasing, in response to the received release message, said communication interface, wherein the release is performed in accordance with what the release message commands and indicates.

13. A first base station for managing a communication interface that is already set-up for communication with another, second base station, the first base station and the second base station being operative in a wireless communication network, wherein the first base station comprises:

one or more processors and a memory, wherein said memory comprises instructions executable by said one or more processors, whereby the first base station is operative to:

determine to release said communication interface, and send, in response to said determination, a release message to the second base station, said release message commanding the second base station to release the communication interface and that comprises an indicator that indicates that it shall be avoided to attempt to again set up the communication interface and/or to set-up any further communication interface between the first base station and the second base station.

14. The first base station as claimed in claim 13, wherein the further communication interface is of a same type as said communication interface being subject for the release.

15. The first base station as claimed in claim 13, wherein the release message comprises a second indicator that indicates whether certain resources associated with the communication interface shall be retained, or shall, or need, not be retained.

16. The first base station as claimed in claim 15, wherein the second indicator indicates that said certain resources shall be retained in response to that it was determined to temporary release the communication interface.

17. The first base station as claimed in claim 13, wherein the first indicator further indicates that said avoidance is valid only temporary.

18. The first base station as claimed in claim 13, wherein said memory comprises instructions executable by said one or more processors, whereby the first base station is further operative to:

release, in response to that said release message has been sent to the second base station, said communication interface, wherein the release is performed in accordance with what the release message commands and indicates.

19. A second base station for managing a communication interface that is already set-up for communication with another, first base station, the first base station and the second base station being operative in a wireless communication network, wherein the second base station comprises:

one or more processors and a memory, wherein said memory comprises instructions executable by said one or more processors, whereby the second base station is operative to:

receive, from the first base station, a release message commanding the second base station to release the communication interface and that comprises an indicator that indicates that it shall be avoided to attempt to again set up the communication interface and/or to set-up any further communication interface between the first base station and the second base station.

20. The second base station as claimed in claim 19, wherein the further communication interface is of a same type as said communication interface being subject for the release.

21. The second base station as claimed in claim 19, wherein the release message comprises a second indicator that indicates whether certain resources associated with the communication interface shall be retained, or shall, or need, not be retained.

22. The second base station as claimed in claim 21, wherein the second indicator indicates that said certain resources shall be retained in response to that it was determined to temporary release the communication interface.

23. The second base station as claimed in claim 19, wherein the first indicator further indicates that said avoidance is valid only temporary.

24. The second base station as claimed in claim 19, wherein said memory comprises instructions executable by said one or more processors, whereby the second base station is further operative to:
    release, in response to the received release message, said communication interface, wherein the release is performed in accordance with what the release message commands and indicates.

\* \* \* \* \*